United States Patent
Kessler et al.

(10) Patent No.: US 6,405,495 B1
(45) Date of Patent: *Jun. 18, 2002

(54) SPILLAGE CONTROL SAFETY FLOOR MATTING

(76) Inventors: Ronald Kessler, 2000 Twin Oaks, Girard, OH (US) 44420; Myron Ullman, 120 Sleepy Hollow Drive, Canfield, OH (US) 44406

(*) Notice: Subject to any disclaimer, the term of this patent is extended or adjusted under 35 U.S.C. 154(b) by 0 days.

This patent is subject to a terminal disclaimer.

(21) Appl. No.: 09/451,336

(22) Filed: Nov. 30, 1999

Related U.S. Application Data

(63) Continuation-in-part of application No. 09/090,621, filed on Jun. 4, 1998, now Pat. No. 5,992,105.

(51) Int. Cl.⁷ ............................................. H47G 27/02
(52) U.S. Cl. ........................... 52/177; 52/664; 52/673; 52/591.2; 52/591.4; 15/215; 15/238
(58) Field of Search ..................... 52/177, 662, 664, 52/673, 591.2, 591.4; 15/215, 216, 238, 239

(56) References Cited

U.S. PATENT DOCUMENTS

| | | | | | |
|---|---|---|---|---|---|
| 3,703,059 A | * | 11/1972 | Kessler | ........................ | 52/177 |
| 3,808,628 A | * | 5/1974 | Betts | ........................... | 15/215 |
| 4,087,948 A | * | 5/1978 | Mellor | ......................... | 52/180 |
| 4,361,614 A | * | 11/1982 | Moffitt, Jr. | ................. | 52/177 X |
| 4,468,910 A | * | 9/1984 | Morrison | .................... | 52/177 X |
| 4,654,245 A | * | 3/1987 | Blazer et al. | ............. | 52/177 X |
| 5,486,392 A | * | 1/1996 | Green | ....................... | 52/177 X |
| 5,628,160 A | * | 5/1997 | Kung | ........................ | 52/177 X |
| 5,634,309 A | * | 6/1997 | Polen | ........................ | 52/177 X |
| 5,833,386 A | * | 11/1998 | Rosan et al. | .............. | 52/177 X |

* cited by examiner

Primary Examiner—Beth A. Stephan
Assistant Examiner—Brian E. Glessner
(74) Attorney, Agent, or Firm—Robert G. Lev

(57) ABSTRACT

A thin flexible floor mat system is configured to resist penetration by high heeled shoes and be capable of being easily rolled up in long segments. The floor mat is constituted by a series of small square sections and are connected together with connectors that permit easy deployment and removal of the mat system by detaching segments of the mat from each other. The mat is flexible but resists penetration from high heels and other forms of traffic by virtue maintaining of a predetermined volume in the areas formed by adjacent cross pieces of the mat. Longitudinal connectors are configured so that the matting connected to half the connector comes away relatively easily while the matting connected to the other half of the connector is held tightly to the connector. Ramp structures are arranged on all outside edges of the mat system. Different connection arrangements between the mat and the ramps are provided.

10 Claims, 4 Drawing Sheets

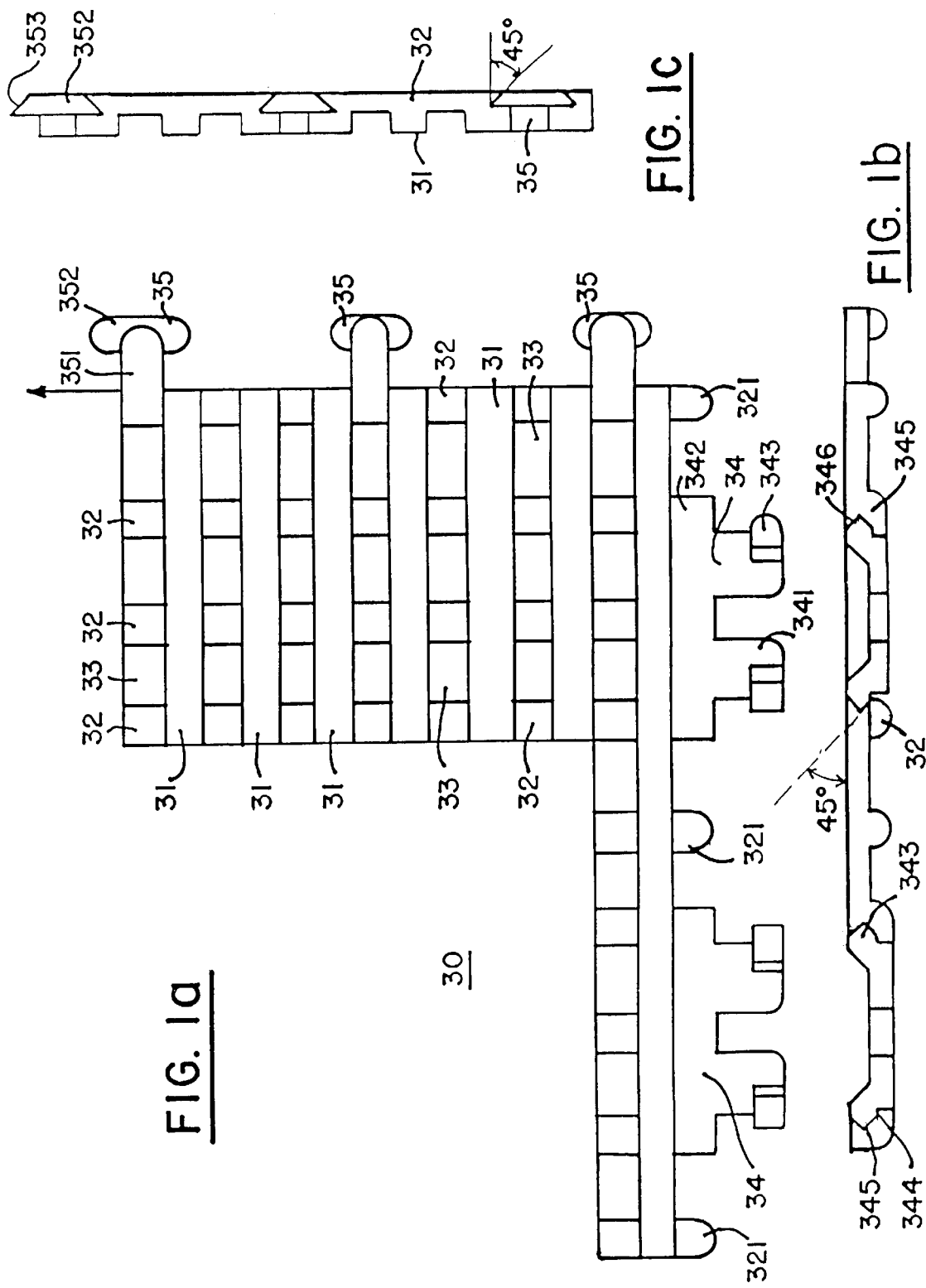

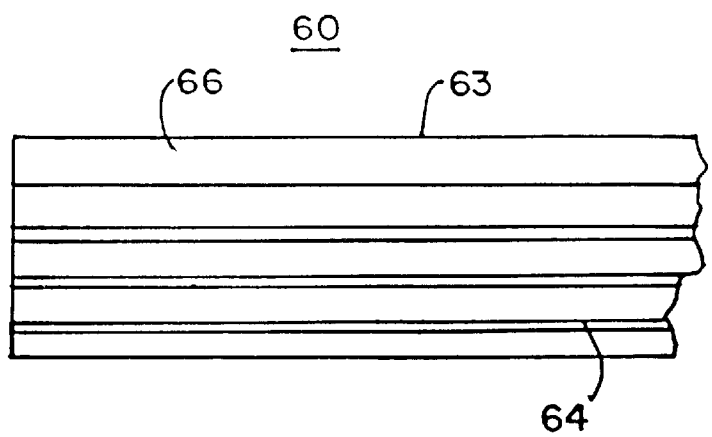
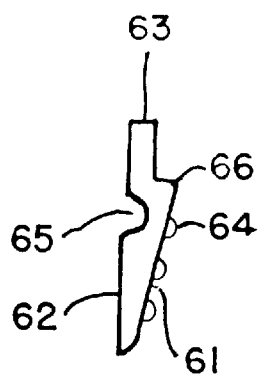
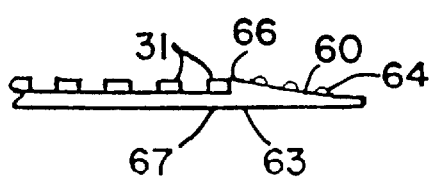
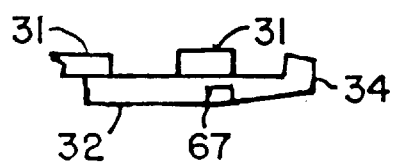
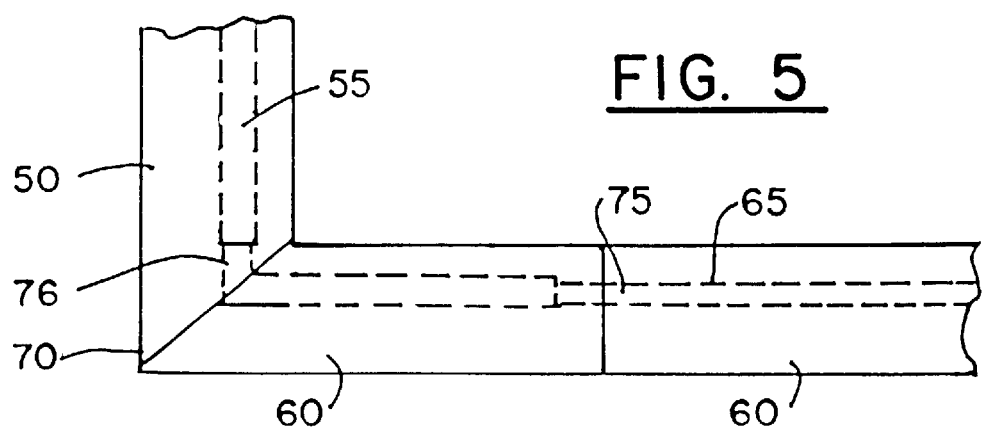

SPILLAGE CONTROL SAFETY FLOOR MATTING

Related Applications

The present application is a continuation-in-part of U.S. patent application Ser. No. 09/090,621, filed Jun. 4, 1998, now U.S. Pat. No. 5,992,105, issued Nov. 30, 1999.

TECHNICAL FIELD

The present invention relates generally to plastic or rubber floor mats providing a raised, perforated high-friction surface suitable for use in damp locations, such as lobbies, etc. More specifically the present invention relates to a method for easily removing and deploying various sizes of floor mat systems by connecting and detaching floor mat sections to and from each other.

BACKGROUND OF THE INVENTION

Perforated rubber or plastic floor mats are useful for providing a safe, high friction surface for people and other traffic moving in damp conditions. This is accomplished by keeping the feet of pedestrians above a damp, cold or otherwise slippery floor.

Normally the upper surface of the floor mat is constituted by a number of narrow, parallel plastic or rubber strips or ribs separated by a distance approximately the same size as the width of an individual strip. Often such strips or ribs have anti-skid corrugations on their top surfaces to provide a high friction walking surface. However, in many cases, the anti-skid corrugations on the top surfaces of the upper portion of the floor mat can create additional hazards. For example, the corrugations may hold particulate matter to the surface of the mat rendering the mat far more slippery than a mat with a smooth upper surface. Also, it has been discussed through use that corrugated surfaces do not exhibit as much friction as that provided by flat mats. This is especially critical with thin mats, which have a tendency to slide when subjected to lateral or horizontal forces caused by traffic. Such forces also tend to pull mat sections away from each other further exacerbating the problem of mat movement. Thus, many thin mats allow hazardous conditions by moving along the floor supporting the mat, even if the traffic intercross the mat interfaces on relatively slip free surface of the mat.

On the other hand, thicker matting may serve as a trap for high heeled shoes. Also, the thicker matting (usually ½" inch or more in thickness) is much more difficult to deploy and remove than thinner matting.

The lower portion of a conventional floor mat usually consists of two series of parallel, spaced strips crossing each other at substantially perpendicular directions, and connected together to provide rectangular perforations through the floor mat so that the floor upon which the mat is laid can easily dry out. Mud and dirt are cleaned from the feet of the users by friction with the upper edge of the mat surface to fall through the perforations to the floor upon which the mat is laid. Such mats are most often used in the lobbies of public buildings, and in damp work situations to keep the feet of workers above a damp floor which can easily become very slick with moisture or debris. The principal purpose of such mats is to enhance the safety of workers or pedestrians passing over a particular surface.

In some cases it is desirable to cover an entire surface of a fairly large area with matting. Since the matting can be fairly heavy or thick, it is often difficult to remove it in order to clean the floor especially if the mat is in a single large piece. If, on the other hand, the mat is made up of a number of smaller pieces loosely laid on the floor, it is difficult to keep them properly connected and aligned. This is especially true if the floor tends to become slippery when wet, or if the nature of the traffic over the mat is such as to cause horizontal lateral stress along a plane parallel to the floor. As a result of such stress, the mat sections may move about creating a hazardous situation, as well as an unsightly appearance.

A number of systems have been proposed to hold floor mat section together. The best-known technique is to use small pieces of matting that are glued to each other. However, in this system it is very difficult to remove the matting without breaking the glue bonds and causing damage to the matting. If the glue bonds are sufficiently strong that the mat portions holds together, then the previously-mentioned problems of dealing with large, heavy mats occur.

Another solution has been the use of connecting devices permanently affixed to the floor, and having projecting connecting portions, such as prongs these are generally known as dog ears, and are forced over the ribs of the floor mats to secure the matting to the floor. However conventional systems using this technique have been hampered by difficulties in attaching and detaching the mat sections to each other and the floor.

Another system for holding mats together is found in U.S. Pat. No. 3,703,059 to Kessler, dated Nov. 21, 1972, and incorporated herein by reference. This system discloses a system for interlocking small floor mats at their edges to provide a single large mat which can be treated as a unit if desired. The system accommodates removal of small floor mat sections for cleaning, as well as replacement of selected floor mat sections. This is accomplished using plastic connectors having locking portions which fit into apertures in the floor mat, and engage both the upper and lower strips or ribs of the mat to lock the mat sections together.

Despite the advantages of the system disclosed in U.S. Pat. No. 3,703,059, substantial problems with the assembly of large mat configurations still exist. The connectors of the Kessler system can be difficult to install so that easy mat alignment will also be difficult. Another factor occurs when long lengths of floor matting are assembled. Traffic along the length of the floor mat creates stresses which tend to pull the mat sections apart, even with the conventional locking system. Further, the locking splines of the Kessler system are subject to rolling allowing the floor mats to separate when certain stresses (caused by traffic) are applied to it. This is further exacerbated by the fact that there are substantial portions of adjoining floor mat sections that are not directly connected by the locking splines. Thus, high levels of traffic, or increased speeds of the traffic, as well as local high stress conditions (such as those caused by high heeled shoes or extremely heavy individuals) can cause mat destabilization and separation.

Another solution to the aforementioned problems associated with floor mats is the use of recessed areas formed in the floor to contain the floor mats. Generally, the recessed areas are sized so that the floor mats are located with their edges against the edges of the recessed area thereby preventing the floormats from sliding when subject to traffic. Ideally, water, snow, liquid detergent, granulated detergent, auto oil, granulated products, and other debris from the sources of traffic pass through the perforations in the mat to keep the top surface of the mat free of standing water and other hazards. Since the top surface of the mat is generally flush with the surrounding surfaces, the mat does not constitute an obstruction. This is especially important when using relatively thick or rigid mats.

While such conventional mat arrangements are adequate for many purposes, there are certain drawbacks. First the building owner or user must plan for the installation of these mats and have the recessed area built into the floor during construction of the building. As a result, additional burdens are created in the planning of the building. In the alternative, the recessed areas can be dug out of the floor after the building has been constructed. However, such operations entail a great deal of expense to the building owner or user. Further, even when a recessed area has been provided to hold the floor mats, extemely large mats may still be moved within the recessed area, possibly causing unsafe conditions.

Another approach includes the use of continuous lengths of matting arranged in roles. However, the rolled matting can be cumbersome to move for cleaning, etc. Also, conventional connections between large sections of matting are often difficult to easily install or disconnect. Consequently, in conjunction with the weight of the matting, awkward conventional connector usually make the deployment and the removal of large sections of matting a long and arduous process.

One approach to the problem of heavy and awkward rolls of matting is to use thinner matting material (generally in the range of 0.25 inch or less). However, one drawback with matting thin enough to be easily rolled is the tendency to be substantially deformed by local stress such as that caused by high heeled shoes, extremely heavy individuals or heavily loaded carts with small casters. Because of the flexibility of thin, conventional, rollable matting, it is common for high heeled shoes to cause deformation of the matting and become stuck in the perforations. As a result, thin, conventional, rollable matting may create another safety hazard even as it is addressing the usual problems of installing and removing large rolls of matting.

Also, by avoiding the complications of floor recesses dedicated to hold floor matting, another disadvantage occurs. The edge of the floor matting is often constituted by a 90° step, which can constitute a hazard to pedestrian traffic, as well as providing some difficulty for heavy small wheeled vehicles or other vehicles with casters. Conventional solutions to the problem are awkward and add a level of complexity, making deployment and removal of the matting even more complex.

Thus the conventional art does not adequately address all the difficulties of deploying and removing substantial amounts of floor matting.

SUMMARY OF THE INVENTION

It is one object of the present invention to provide a floor mat interlocking system that is easily assembled and removed.

It is another object of the present invention to enhance continuity of connected floor mat sections by means of the weight of traffic moving over the mats.

It is a further object of the present invention to provide a floor mat system that is not destabilized by the movement of traffic over the mat.

It is an additional object of the present invention to provide a floor mat interconnection system that does not allow unintended separation of adjoining mat sections, or unintended mat movement or lifting of the mat from the floor.

It is still a further object of the present invention to provide a system to maintain floor mat alignment.

It is yet another object of the present invention to provide a floor mat system in which individual sections of the mat are easily removed and replaced without disrupting any other sections of the mat.

It is again a further object of the present invention to provide a floor mat that can be easily deployed or removed by being rolled up in sections.

It is also another object of the present invention to provide a sectionalized floor mat that can be connected together with easy snap-fit connectors.

It is still another object of the present invention to provide a floor mat system having the benefits of a floor mat system arranged in floor recesses without the disadvantage of constructing floor recesses.

It is yet a further object of the present invention to provide a floor mat system that avoids the drawbacks of a sharp step between the floor and the top of the mat.

It is again another object of the present invention to provide a floor mat system that admits to easy arrangement of both intermediate and end pieces along the length and width of mat.

It is still an additional object of the present invention to provide a large continuous rollable floor mat that is constituted by a series of much smaller sections connected to each other.

It is yet another object of the present invention to provide a floor mat configuration that resists penetration by high heeled shoes or other high stress incidents of traffic over a flexible floor.

It is again a further object of the present invention to provide a floor mat configuration that deals with excessive unit load transmitted by wheels without substantially deforming the mat or moving it.

It is still another object of the present invention to provide a floor mat configuration that distributes spillage so that there is no overflow onto the surface of the mat system.

It is yet another object of the present invention to provide a floor mat system that can maintain safe conditions by accommodating spillage of liquid and particulate detergent, plastic and rubber particles, metal particles, and organic particulate matter such as sugar, and other debris as well as motor oil and other viscous materials.

It is an additional object of the present invention to prevent or limit warping of a floor mat along it's length.

It is again a further object of the present invention to prevent dimpling along the length of a mat section.

It is still a further object of the present invention to compensate for variations in size due to thermal factors along the length of a floor mat.

These and other objects of the present invention are achieved by a first embodiment including a mat system arranged on a floor to provide a safe, dry walking surface. The system includes a plurality of upper, substantially parallel strips where the upper strips are perpendicular to the longitudinal direction of traffic along the mat system. There is also a plurality of lower substantially parallel strips which are arranged perpendicular to the upper strips so that the upper surfaces of the lower strips are in contact with the lower surfaces of the upper strips. The widths and thicknesses of both types of strips as well as the spacings therebetween are always balanced so that a specific volume of approximately 0.02–0.03 cubic inches is maintained in each perforation of the mat, where the volume is defined vertically between the bottom surfaces of the lower strips and the upper surfaces of the top strip, and vertically by the innerfaces of adjacent pair of upper strips and the innerfaces of an adjacent pair of lower strips.

In another aspect of the present invention the goals and objects are achieved by a mat system constituted by a plurality of mat sections connected together. Each mat section includes a plurality of upper substantially parallel strips which are perpendicular to the longitudinal direction of traffic along the mat system. The mat is further constituted by a plurality of lower substantially parallel strips arranged perpendicular to the upper strips so that the top surfaces of the lower strips are in contact with the lower surfaces of the upper strips. Each mat section further has a plurality of longitudinal connectors arranged to extend in the longitudinal direction of traffic. Each longitudinal connector is connected to a respective mat section at one end and extends to connect an adjacent mat section at a second end. The longitudinal connector is constituted by two parallel support pieces arranged to extend on either side of a selected lower strip of an adjacent mat section. A pair of connecting prongs extending upward and outward from each support piece is arranged to fit over two lower strips adjacent to the selected lower strip of an adjacent mat section. Each of the connecting prongs has a first lower surface extending at an angle of approximately 45° from the horizontal plane.

Another aspect of the present invention is embodied by a mat system which is arranged on the floor to provide a safe dry walking surface and which is constituted by a plurality of mat sections. Each of the mat sections includes a plurality of upper substantially parallel strips which are perpendicular to the longitudinal direction of traffic on the mat system. Also included in each section is a plurality of lower substantially parallel strips which are arranged perpendicular to the upper strips so that the top surfaces of the lower strips are in contact with the lower surfaces of the upper strips. Further included in each section is a plurality of latitudinal connectors, each latitudinal connector being constituted by a support piece extending parallel to the upper strips and connected thereto so that each support piece is fitted between two adjacent upper strips and lies over the lower strip at the edge of the mat. Each of the latitudinal connectors also has a connecting prong extending on either side of the support piece and attached to the lower surface of the support piece so as to extend beneath two adjacent upper strips of an adjacent mat section.

An additional aspect of the present invention is embodied by a mat system arranged on a the floor to provide a safe, dry walking surface and constituted by a plurality of mat sections. Each of the mat sections includes a plurality of upper substantially parallel strips arranged perpendicular to the longitudinal direction of traffic along the mat system. Each mat section also includes a plurality of lower substantially parallel strips arranged perpendicular to the upper strips where the upper surface of the lower strips are in contact with the lower surfaces of the upper strips. The mat system further is constituted by a plurality of easy-lock/release longitudinal connectors. Each of these easy-lock/release connectors includes two parallel support feet arranged on either side of the lower strip of a first mat section and bisected into first and second halves when connecting two adjacent mat sections. The easy-lock/release connector further includes two sets of upwardly extending protrusions on a first half and a single set on the second half. Each of the protrusions fills a space created by a pair of adjacent upper strips and a pair of lower strips. Each of the protrusions also has a connecting prong extending outwardly therefrom in a direction approximately parallel to the upper strips and arranged to fit over adjacent lower strips. Each of the connecting prongs on the first half of the lateral easy-lock/release connector having a lower surface extending parallel to the upper surfaces of the upper strips and the lower strips. On the other hand, the protrusions on the second half of the easy-lock/release longitudinal connector each has a lower surface extending at an angle of approximately 30° from horizontal.

Still a further aspect of the present invention is embodied in a mat system arranged on a floor to provide a safe, dry walking surface. The mat system it includes a plurality of upper substantially parallel strips which are perpendicular to the longitudinal direction of traffic along the mat system. Also included is a plurality of lower substantially parallel strips which are arranged perpendicular to the upper strips, so that the upper surfaces of the lower strips are in contact with the lower surfaces of the upper strips. Also included is a latitudinal ramp extending perpendicular to the direction of traffic and arranged at the latitudinal periphery of the mat system. The latitudinal ramp is constructed to have a lower surface which is arranged on the floor and an upper surface which extends from the upper surface of the upper strips to the floor thereby creating a slope. The latitudinal ramp further has a continuous protrusion with a notch therein arranged to fit beneath an adjacent upper strip at the lateral edge of the mat system and part of any abutting lower strip.

Yet another aspect of the present invention is embodied in a mat system arranged on the floor to provide safe, dry walking surface where the mat system includes a plurality of upper substantially parallel strips arranged perpendicular to the longitudinal direction of traffic along the mat system. Also included is a plurality of lower substantially parallel strips arranged perpendicular to the uppers strips so that the upper surfaces of the lower strips are in contact with the lower surfaces of the upper strips. A longitudinal ramp extends parallel to the direction of travel along the longitudinal periphery of the mat system and includes a lower surface arranged on the floor and an upper surface extending from the upper surface of the upper strips to the floor. The longitudinal ramp has a plurality of connecting protrusions arranged to fit over and adjacent lower strip and between two adjacent upper strips at the longitudinal edges of the mat system, each connecting protrusion has a vertically extending hook to hold the opposite surface of an adjacent lower strip.

BRIEF DESCRIPTION OF THE DRAWINGS

FIG. 1(a) is a top view diagram of the mat system, including connectors of the present invention.

FIG. 1(b) is an end elevational view diagram of FIG. (a) depicting the longitudinal connectors of the present invention.

FIG. 1(c) is a side elevational view diagram of FIG. 1(a) depicting the latitudinal connectors of the present invention.

FIG. 4(a) is a top view diagram of a latitudinal ramp structure running along the width of the mat.

FIG. 4(b) is a side view diagram of FIG. 4(a).

FIG. 4 (c) is a side view diagram depicting the interface between the latitudinal ramp of FIG. 4(b) and an edge of the mat.

FIG. 4 (d) is a side elevation view diagram of a lateral edge of the mat with a longitudinal connector depicting a notch for accommodating the latitudinal ramp.

FIG. 5 is a top view depicting a miter joint between latitudinal ramp and a longitudinal ramp.

DETAILED DESCRIPTION OF THE PREFERRED EMBODIMENTS

The present invention is a modification of the floor mats disclosed in U.S. Pat. No. 3,703,059, and incorporated herein by reference. U.S. Pat. No. 3,703,059 needs no further elaboration for purposes of understanding the present invention.

Figure 2A:
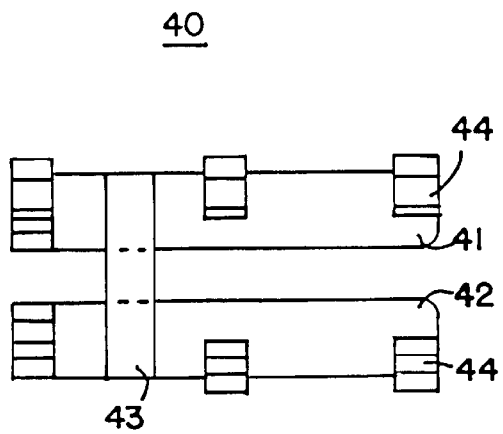
FIG. 2(a) is a top view diagram of an easy-release/lock connector of the present invention.

While the present invention can encompass various spacing configurations between the upper and lower mat strips or ribs, the first embodiment of the present invention is preferably practiced with a uniform size for upper and lower mat strips, as well as uniform spacing between both the upper and lower strips. The second and third embodiments of the present invention reside in the distinctive longitudinal and latitudinal connectors depicted in FIGS. 1(a)–1(c). The fourth embodiment of the present invention resides in an easy-lock/release longitudinal connector depicted in FIGS. 2(a)–2(c), and which is used to hold together long segments of matting, usually kept in separate rolls. The fifth and sixth embodiments of the present invention, as depicted in FIGS. 3(a)–3(b) and 4(a)–4(d), respectively, reside in longitudinal and latitudinal ramp structures that avoid the problems inherent when a mat terminates in a sharp step configuration.

The novelty of the first embodiment of the present invention resides in the exact relationship of strip width, height and the spacing between them. To best understand the structure and fuinctionality of the first embodiment of the present invention, reference is made to FIGS. 1(a)–1(c). Floor mat 30 in FIG. 1(a) can be of any size for the first embodiment of the invention. However, preferably such mats are in 2 foot by 2 foot sections that are easily assembled (and disassembled) with other mat sections to form large area floor mats. The mat is constructed of upper strips or ribs 31 and lower strips or ribs 32 running perpendicular to ribs 31 and beneath them. The dimensions and proportions can change based upon the requirements of a particular mat system.

Since the mat is configured so that the lower ribs or strips 32 run continuously in the direction of traffic, a series of conduits between these ribs are formed to allow spillage to travel away from its original point of the spill. As a result, the spilled material spills out over the floor beneath the mat, and does not rise to the level of the upper strips 31 to create a hazard. These conduits are arranged to be continuous over the entire length of the mat, allowing the spillage to spread evenly over the floor beneath the mat. In order to facilitate these continuous conduits, the mat is preferably formed in a continuous length. To facilitate easy removal of the matting so that the floor beneath can be cleaned, the mat material must be sized (preferably 0.25 inch) so that the mat can be rolled up. Extremely long sections of mat can be split up so as to be rolled up in separate coils. The matting of the separate coils is connected to that of other coils using the easy-release/lock connector of FIGS. 2(a)–(d).

The continuous conduit formed by the lower ribs or strips 32 need not always be in the direction of traffic. Instead, they can be perpendicular to the direction of traffic so that the upper strips 31 run parallel to the direction of traffic. However, in this application for ease of providing a clear description through the use of maintaining a constant orientation, the lower strips are described as extending parallel to the direction of traffic on the mat system. Further, while the mat system is preferably configured to have the upper and lower strips perpendicular to each other, this is not absolutely necessary to practice the present invention. Rather, the upper strips can be arranged at an angle other than 90° to the lower strips. Further, neither the upper strips or the lower strips are necessarily arranged in parallel, although this is the configuration of the preferred embodiment. Rather, the upper strips may form virtually any pattern with respect to each other as long as sufficient space is retained for spillage to drain out through the upper strip and the pattern results in a safe walking surface. The lower strips must be maintained in an arrangement to constitute the necessary conduits over the length of the mat system thereby allowing spillage to spread evenly over the floor and not constitute a hazard by overflowing a top portion of the mat due to containment of the spillage.

While the rib configuration of the present invention can be irregular, the ribs or strips 31,32 are preferably all of uniform thickness and width. Also, the spacing between all of the strips is uniform and is equal for both upper and lower strips. A uniform arrangement of the ribs or strips 31, 32 allows the first preferred embodiment of the present invention to be practiced most easily. Preferably the matting material is of thermoplastic. However, other plastic materials can be used as long as they are sufficiently flexible. The matting can also be formed of rubber although rubber is not the best material in which to configure the mat to have the best advantages offered by the present invention. Consequently, the preferred embodiment of the present invention utilizes plastic, and is preferably grey in color.

The strip arrangement depicted in FIG. 1(a) more clearly depicts the functional relationship of the first preferred embodiment of the present invention. In particular, block 33 represents the space between a pair of lower strips 32 and a pair of overlying upper strips 31. This volume of space labeled 33 in FIG. 1(a) is bounded vertically by the upper surface of the upper strips 31 and the lower surface of the lower strips 32 (the floor on which the mat rests). Horizontally, volume 33 is bounded on two sides by the facing surfaces of two upper strips 31, and on the two other sides by the two facing surfaces of a pair of horizontal strips 32. Thus, volume 33 is a cube of space defined by the top and bottom of the mat and a pair of lower strips as well as a pair of overlying upper strips. It has been determined that if the volume of space defined in perforation 33 is between 0.02 and 0.03 cubic inches, a mat approximately 0.25 inch in thickness will be supported by the floor and thus, will only slightly deform under local pressure caused by traffic such as cart wheels or high heeled shoes. This deformation will not be sufficient to enlarge the perforation and permit a high heeled shoe to become wedged in the perforation. Nor will there be any tendency for the mat to "ball-up" or otherwise move about on the floor due to high local loads.

It is to be noted that while it is necessary to maintain the spacing of upper and lower strips 31, 32 so as to maintain a volume between 0.02 and 0.03 cubic inches, a perforation size that permits easy entry by a high heeled shoe is to be avoided even if the volume range of the perforation is being maintained. This is true for any thickness of mat but becomes more of the problem for matting material approximately 0.5 inch or thicker since the greater thickness of the mat tends to trap the high heel far more firmly than is possible with a thinner mat.

There are additional problems when a mat becomes greater than 0.25 inches in thickness. In particular, such a mat, for example 0.5 inch thick, is very difficult to roll up into a manageable coil, even if only limited lengths are being used. The arrangement of the present invention permits upper and lower strips of different dimensions, thicker or more narrow strips and different shapes for the space defining the volume of perforation 33. Further, it is not necessary that the arrangement of the strips, either upper or lower be uniform. Rather, the arrangement can be that depicted in FIG. 1, as long as the largest perforation maintains a volume of 0.02–0.03 cubic inches.

In the first preferred embodiment of the present invention as depicted in FIGS. 1(a)–1(c), the thickness of both upper and lower individual strips 31,32 is approximately 0.12 inch, while the width of both upper and lower strips is approximately 0.25 inch. The spacing between both the upper and lower strips or ribs can be any value whereby the volume of a perforation 33 is maintained between 0.02 and 0.03 cubic inches, but in the preferred embodiment is the same as the width of the strips. Another constraint is that the mat must be thin enough (approximately 0.25 inch or less) to allow the mat to be rolled for easy removal and redeployment. Consequently, the thinner that the mat is made, the less space that can be allowed between both the upper and lower strips.

Label 34 in FIGS. 1(a) and 1(b) identify longitudinal connectors. The label 35 in FIGS. 1(a) and 1(c) refer to latitudinal connectors. The longitudinal connectors connect mat sections along the length (direction of traffic) of the mat system. The latitudinal connectors connect mat sections together along the width of the mat system. The example depicted in FIGS. 1(a)–1(c) include longitudinal connectors on one edge only and latitudinal connectors on one edge only. However, the embodiments of the present invention that includes the subject longitudinal and latitudinal connectors can be practiced using virtually any combination of such connectors on the mat sections. For example, mat sections can be provided that have no connectors while other mat sections can be provided having connectors on all four edges. Just as the size of the mat sections can be changed from the preferred 2 foot by 2 foot dimensions, so can the number and spacing of both the longitudinal and latitudinal connectors (34,35).

Preferably the 2 foot by 2 foot sections are integrally molded or formed to include at least one type of connector (34,35). In another variation, both types of connectors can be formed on each 2 foot by 2 foot mat section. Then the connectors on each section are cut off where appropriate in order to form the desired mat configuration. This method of integrally forming the longitudinal and latitudinal connectors two separate mat sections provides the most efficient and most flexible approach to creating a wide variety of different mat configurations.

While either or both of the connectors (34,35) can be molded as part of a mat section in the preferred embodiment, they can also be bonded to the mat by an adhesive or any other means known to those skilled in this art. One such technique is to bond two pieces of plastic using solvent applied to the areas where bonding is desired. Further, the connectors 34,35 can be connected to the mat by means of any number of different mechanical arrangements. One example of a mechanical connection is depicted in FIG. 2(a)–2(d), as described infra. In this variation, both longitudinal and latitudinal connectors are made of the same material as the mat (preferably plastic). However, if formed separately, the longitudinal and latitudinal connectors can be made of any other suitable material, such as nylon, rubber, plastic, etc.

The longitudinal connectors 34 extend along the plane of the lower strips or ribs 32 and are of uniform thickness in order to facilitate a smooth transition between mat sections. The longitudinal connector consists of two support feet 341, each having a single connecting prong 343 extending upward and outward from the support feet as depicted in the cross section view FIG. 1(b). The support feet are connected to the main body of the mat section by spacer piece 342. The spacer also has the same thickness as the lower ribs or strips 32 in order to provide a smooth transition between mat sections. When the longitudinal connector is not formed as part of a mat section, the bonding between the longitudinal connector and the mat section occurs between the spacer 342 and the ends of the lower ribs 32 and the bottom of upper ribs 31. The spacer is preferably the same thickness as an upper strip so as to space the upper strips 31 of two adjoining mat sections the proper distance from each other.

The support feet 341 extend under the first upper strip of an adjoining mat section. Each support foot extends between a pair of lower strips on the adjoining mat section, and the pair of support feet is arranged on either side of a single lower strip of the adjoining mat section. Thus, the longitudinal connector 34 interfaces with three lower strips 32 of an adjoining mat section. When connecting to an adjacent mat section the two support feet straddle and fit closely along a first lower rib or strip 32 of an adjoining mat section. Connecting prongs 343 extend over the two adjacent lower ribs on either side of the first rib of the adjacent mat section.

Each connecting prong 343 has a first lower surface 344 formed in virtually the same plane as the top of a lower rib 32, and meant to fit snugly thereover. A second lower surface 345 is formed at an approximate 45° angle to the first lower surface to facilitate easy removal of one mat section from another. The 45° angle allows moderately easy movement between the connecting prong and the lower rib that is held by the connecting prong when the adjacent mat section is lifted from the mat section to which the longitudinal connector is bonded. This arrangement provides a relatively easier release than would occur if the entire bottom surface of connecting prong 343 was formed of a surface parallel to the top surface of the lower rib 32.

The connecting prong 343 has an angled upper surface 346 which is formed at a 45° from horizontal. This 45° angle permits easier connection between the mat sections by allowing the lower rib of an adjacent mat section to slide more easily over the connecting prong into the locked position with the connecting prong held firmly over the top surface of an adjacent lower rib.

In the alternative, if larger mat sections are desired, they can be permanently formed by bonding the longitudinal connectors 34 to the adjacent mat sections. This can be done by means of adhesive solvent bonding or even welding the rubber or plastic material.

Preferably each longitudinal connector 34 spans a distance sufficient to interact with three adjacent lower ribs of an adjacent mat section. The longitudinal connectors are spaced from each other on center lines approximately 2.62 inches, and extend approximately 1.3 inches from the opposite tips of the two connecting prongs 343. However, these dimensions are exemplary only and can be modified to suit any particular mat system in which the longitudinal connectors are to be applied.

Normally the longitudinal connectors 34 span a width of 3 lower strips or ribs 32, and are separated from each other by a lower strip and two of the normal spaces between lower ribs. However, this spacing is not mandatory to practice the present invention, and can be increased at the discretion of the mat designer. Likewise, the space from the center line of the longitudinal connector 34 is indicated in the preferred embodiment as being 2 inches from the edge of the mat. This spacing is not required to practice the present invention. However, the indicated length of the longitudinal connector is necessary to permit the longitudinal connector to be placed as close to a lateral edge of the mat as possible.

The longitudinal connectors 34 can be permanently connected to adjacent mat sections by using adhesive or solvent bonding, as well as any other technique known to those skilled in the plastic forming art. However, such additional bonding is not always necessary due to the sizing and spacing of the parallel support feet 341 of the longitudinal connector. In an alternative embodiment, the support feet are spaced so that it must crimped to fit between the lower ribs 32 of an adjacent mat section. The nature resilience of the plastic material constituting the support feet to exert an outward pressure against the lower ribs of the adjacent mat section thereby providing a strong mechanical bond that is not easily loosened unless the bottom of the mat is exposed so that the parallel feet can be compressed to release its grip on the lower strips of the adjacent mat section. While this mechanical bond functions well enough to allow adjacent mat sections to be firmly connected together without the use of adhesives or other bonding methods, applying mechanical force to press each pair of support feet can be somewhat problematical when assembling the mat. In order to apply the force properly, the bottom of the mat must be exposed so that force can be applied directly to the parallel support feet, preferably with a pair of plyers. Ultimately, this would entail lifting up large mat sections, which could prove awkward. Consequently, the mechanical connection is generally considered a permanent bond between mat sections. When such an arrangement is used, the longitudinal connector is preferably molded as part of an overall mat section, rather than connected by adhesive or some other method.

Rib stubs 321 extend from the lower ribs 32 the same distance as the thickness of the spacer piece 342. This is done to allow a smooth transition between adjacent mat sections and those areas not occupied by the longitudinal connectors 34. The spacing provided by these stubs also facilitate a more precise fit between mat sections. The stubs can be formed by cutting sections of mat when longitudinal connectors are bonded to the edge of the mat. On the other hand, these stubs can be formed as part of the molded structure of the mat section.

FIGS. 1(*a*) and 1(*c*) depict a top view and side cross sectional view, respectively, of the latitudinal connectors designated by 35. Each lateral connector has a support piece 351 and a connecting prong 352. This connecting prong is formed to the bottom surface of the support piece and positioned so that the bottom surface of the connecting prong is coplanar with the floor upon which the mat system rests. The top and bottom surfaces of connecting prong are connected by a smooth lateral surface 353. As depicted in FIG. 1(*c*), the upper surface of the connecting prong is larger than the lower surface so that the lateral surface is formed at angle of approximately 45° to 60° from the vertical (the plane of the floor). This angle allows the latitudinal connector 35 to be more quickly and easily installed when putting mat sections together. Thus, connection operation are easily carried out by placing two mat sections together, positioning the lateral connectors over the space between upper strips or ribs 31 of an adjacent mat section and stepping on the latitudinal connectors to force them between adjacent upper ribs so that the connecting prongs lock beneath the adjacent upper strips on either side of the support piece holding the connecting prong.

The support piece 351 can be bonded to its respective mat section with an adhesive or solvent attaching one end of the support piece between two adjacent upper strips and over the lower strip 31 positioned at the edge of the respective mat from which the latitudinal connector extends. However, in the preferred embodiment, the latitudinal connector 35 (as well as the longitudinal connectors 34) are formed as part of the overall mat section.

As depicted in FIGS. 1(*a*) and 1(*c*), the latitudinal connectors 35 are spaced apart by three upper strips 32. The latitudinal connector arranged closest to the longitudinal edge of the mat, is spaced at about 0.87 inch from the edge. The separation between the center line of the latitudinal connectors is approximately 1.5 inches along the entire length of the mat section. As further depicted in FIG. 1(*a*) the latitudinal connector extends approximately 0.25 inch from the latitudinal edge of its mat section to the inner edge of the connector on the width of the rib 32 of an adjacent mat section.

When connecting to an adjacent mat, the support piece 351 extends over a lower strip 32 of an adjacent mat section while the connecting prong 352 is placed on the interior side of the subject lower strip 32 and in the same plane while extending beneath two adjacent upper strips 31 that straddle the support piece. Mat sections can be held together latitudinally using only the mechanical forces created by the arrangement of the latitudinal connector. In the alternative, mat sections can also be bonded to each with adhesive or solvent along various portions of the latitudinal connectors to make the connections between mat sections permanent. The mechanical locking is facilitated by the support piece which is the same thickness as the upper strips 31 and of the same width as the space between the upper strips. The connecting prong is the same thickness as the lower strips 32 so that the bottom of the connecting prongs lie flat on the floor along with the bottom surface of the lower strip or rib. This close fit facilitates the strong mechanical connection between two mat sections in the latitudinal direction of the mat system.

The floor mats can be cut or molded so that both types of connectors 34,35 are arranged in alternating manner on adjacent mat sections. Normally the longitudinal connectors 34 are spaced at such a distance that complementary connectors (from adjacent mats) could not fit between two of them. However, the present invention can accommodate different spacing of these connectors so as to permit a complementary longitudinal connector from an adjacent mat section to fit between a pair of longitudinal connectors on the first mat. In order to accomplish this, a mat sections would have to be molded and then adjusted (by cutting or bonding connectors) so that the alternating connectors would fit between each other on adjacent mat sections. In the alternative, special molds can be made of complementary mats so that two such mat sections could always fit together without cutting or other adjustment.

As previously indicated, it is desirable for mat sections to be connected together both latitudinally and longitudinally with respect to the direction of traffic on the mat. One advantage of making the connections between mat sections permanent by means of adding adhesives to the longitudinal and latitudinal connectors (34,35) is that the mats can be rolled up for easy removal. Once the purpose of removing the matting has been achieved, the mats are easily redeployed simply by unrolling.

As previously indicated, thin mats (approximately 0.25 inch) are required in order to achieve sufficient flexibility to allow practical rolling to be carried out. If the mats are too thick or inflexible the diameter of the rolls will be so large that the benefits of rolling up the matting will be lost. On the other hand, matting that is too thin or tends to have too great of volume in the perforations between the mat strips may not be suitable to prevent enlargement of the perforations and subject to penetration by high heeled shoes. Thus, while such matting may be easily rolled for removal and subsequent redeployment, the matting may be inferior with respect to creating a safe pathway for traffic. Also, matting that is not sufficiently robust may not provide particularly strong latitudinal and longitudinal connectors between mat sections so that the highly flexible matting may come apart unless bonded sufficiently with adhesive. The necessity of using adhesive is largely avoided by the robust mechanical properties of the latitudinal and longitudinal connectors (34,35) of the present invention.

Even with matting of optimum thickness (approximately 0.25 inch) and optimum perforation size (approximately 0.02–0.03 cubic inches) described with respect to various embodiments of the present invention, there are limitations as to how much matting can be included on one roll. Manipulations of the matting system of the present invention have indicated that an optimum size of approximately 12 feet in the longitudinal direction of traffic along the mat system. Thus, in another embodiment of the present invention, the mat system would be divided into 12 foot lengths, each having the same width as that of the overall mat system. Each of these 12 foot sections would each be contained within a separate roll of matting, and when deployed would be tied together with special connectors (as depicted in FIGS. 2(a)–2(d). Because of the size and difficulty inherent to handling 12 foot rolls of matting which are often of considerable width, connectors that are easy to lock and release are especially important. The connector of the present invention can be placed on one section of matting, which is placed on the floor and connected to another section of matting by simply pressing the second section of matting over the connector, preferably by stepping on them.

This is facilitated by easy-lock/release connector 40, depicted in FIGS. 2(a)–2(d). The connector is constituted by two support feet, 41, 42. These are connected together by a spacer bar 43 which divides the easy-lock/release connector into first and second halves, depicted as the right and left sides respectively of spacer bar 43 in FIG. 2(b).

Spacer bar 43 holds support feet 41, 42 together in a rigid spaced arrangement. The first half of the connector (right hand side of spacer bar 43) has two sets of upward protrusions 44. The second half (left side of space 43) has one set of upward protrusions. These are sized to fit snugly into the perforations between upper and lower strips 31,32. To do this, the upper protrusions 44 must be the same thickness or slightly less than an upper strip or rib 31. Since the thickness of the support feet 41,42 is the same as that of the lower strips or ribs, 32, the upper extending protrusions 44 will have upper surfaces that are approximately coplanar with the upper surfaces of the upper strips 31. Each set of upper protrusions for a single half are separated by the upper strips 31 when connected.

Figure 2C:
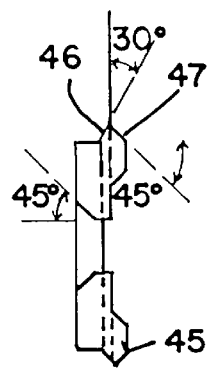
FIG. 2(c) is a end elevation view diagram depicting the structure of FIGS. 2(a) and 2(b).

Each of the upward protrusions 44 has an outwardly extending connection prong 45. Preferably, for the second half of connector 40 this prong is shaped as depicted in FIG. 2(c), having two surfaces 46 and 47, that extend outward, and over a lower strip or rib 32 when connecting to a mat section. The connecting prong is positioned with respect to the bottom of connector 40 so that the prong tightly fits over a lower rib 32 thereby creating a secure mechanical connection. As depicted in the embodiment of FIG. 2(c), connecting prong 34 extends approximately 0.062 inch over an adjacent lower strip of a mat section to which connector 40 is interfacing. However, this dimension is not necessary to practice the inventive easy-lock/release connector since the size of the connector can change as the size of the mat changes.

Upper surface 47 of connector 40 is preferably arranged at a 45° angle with respect to the horizontal (upper surface of both the connector 40 and associated upper strips 31). This allows an adjacent lower strips to easily slide by the connection prong 45 when connecting two mat sections together with connector 40. Connecting lower surface 46 is at an approximately 30° angle from horizontal. This angle, which can be anywhere from 30° to 45° serves to allow an easy release when the mat must be separated from the connector when both are being removed from the floor.

The easy connect and release arrangement on the second side (left hand side of spacer bar 43) of connector 40 is used to facilitate easy connection and removal of floor mat sections. Consequently, only one set of connecting prongs as configured in FIG. 2(c) is used. However, in an alternative arrangement two sets of upward protrusions 44 and connecting prongs 45 can be used. However, they must be configured to have slanted surfaces 46 and 47 as depicted in FIG. 2(c).

Figure 2D:
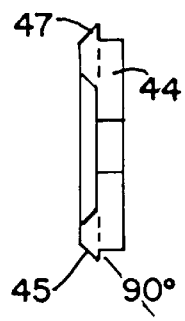
FIG. 2(d) is an end elevation view diagram depicting the different configuration that of FIG. 2(c).
Figure 2B:
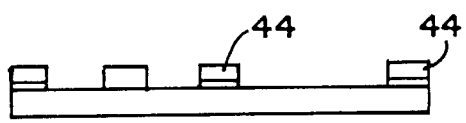
FIG. 2(b) is a side elevation view diagram of the structure of FIG. 2(a).
Figure 3A:
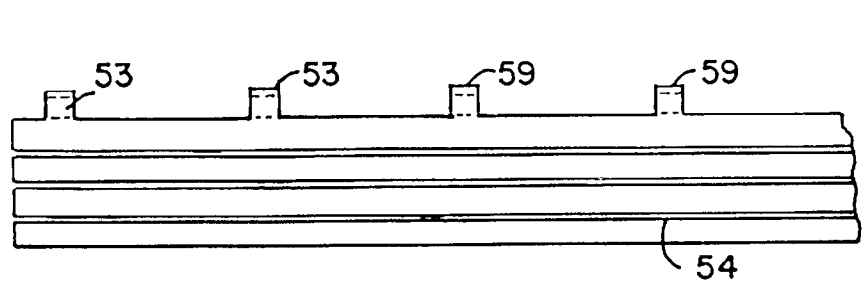
FIG. 3(a) is a top view diagram of a longitudinal ramp structure running along the length of the mat.
Figure 3B:
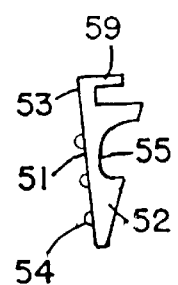
FIG. 3(b) is a side view diagram of the structure of FIG. 3(a).

The first half of connector 40 (right hand side of spacer bar 43) is configured to have connection prongs 45 with the surfaces 46, 47 as depicted in FIG. 2(d). For easy assembly surface 47 is approximately 45° from horizontal, similar to that in FIG. 2(c). However, since the first half of connector 40 is meant to be a permanent attachment to it's mat section, the surface 46 is formed in a horizontal plane, or 90° with respect to vertical to more firmly hold the surface of the lower strips to which the connecting prong will be attached. Normally, the connecting prongs of the first half of connector 40 will be bonded to adjacent pieces of the mat section to which connector 40 is to be attached. This can be done by adhesive solvent bonding, or thermal welding.

In an alternate embodiment, the angled surfaces 46, 47 would be used on all the connection prongs 45 on both halves of the connector 40. This would allow the connector to be detachable from both adjacent mat sections rather than just one of them. This arrangement would allow the mat to be rolled more easily since the connector would not be extending from mat section at either end of the preferred 12 foot rolls.

The subject easy-lock/release connector 40 is sized to fit with the previously described mat system constituted by sections held together with the longitudinal and latitudinal connectors of FIGS. 2(a)–2(d). As such, connector 40 is approximately 3.125 inches long and approximately 1.165 inches wide. The total height of connector 40 is approximately 0.25 inches, the same height as the overall mat system. A change in the configuration of the mat would also cause the size of the connector 40 to change in order to maintain the proper fit within the perforations 33 of the mat.

The easy-lock/release connectors 40 are preferably applied between 12 foot segments (longitudinally) for the mat segments, and approximately every 2 foot along the width of the mat. However, longer or shorter lengths of mat can be connected together with connectors 40 and a greater or lesser frequency of these connectors can be deployed along the width of the mat while still practicing the present invention. The selection of connector density and mat segment length will ultimately depend upon the exact environmental features and the level of safety that is sought commensurate with those conditions.

Easy-lock/release connector 40 can be made from a material more rigid than that of the matting. Materials such as hardened rubber, and plastic are all appropriate. However, the connector 40 is preferably made of material having the same rigidity as that of the matting while still maintaining the functionality of this embodiment of the present invention. When the easy-lock/release connector is molded as part of a mat section (in the same manner as the previously discussed longitudinal and latitudinal connectors, 34 and 35, respectively), the easy-lock/release connector can be used in place of longitudinal connector 34. While the mechanical stress-connection arrangement of longitudinal connector 34 is not present in longitudinal connector 40, permanent bonding between mat sections can be achieved by adhesive, solvent bonding, and any other means known to skilled practitioners of plastic manipulation. Since compression of the support feet (41,42) of connector 40 is not necessary to make the connection for reasons previously described, connection between mat sections can be facilitated without turning over the mat, and without resort to compressing tools such as plyers. Effective, stress-free mechanical connection can be facilitated using just the connecting prongs 44 by pressing an adjacent mat section over the prongs. Thus, installation becomes relatively easy. If permanent connection between mat sections is desired, the end of connector 40 which is not molded as part of a mat section can be connected to an adjacent mat section using adhesive, solvent bonding or some other technique. Consequently, this embodiment of connector 40 should be considered the preferred embodiment.

FIGS. 3(*a*), 3(*b*), and 4(*a*)–4(*d*) depict longitudinal and latitudinal peripheral ramp structures. Both the latitudinal and longitudinal ramps have slopes to make the transition from the top of the mat (approximately 0.25 inch) down to the floor supporting the mat over a length of approximately 0.9 inch. These dimensions are representative only and can be altered accordingly for thicker or thinner mats.

Longitudinal ramp 50 extends along the longitudinal side edges of the mat system and runs the entire length of the mat. The sloping surface 51 has a number of ridges 54 running along the entire length of the ramp to enhance traction for those walking over the ramp. The bottom surface 52 is placed on the floor supporting the mat system, and additional holding capacity (with the floor) is provided by an approximately semicircular concavity 55 running along the length of the ramp 50. The ramp structure is held to the edge of the mat by means of connecting protrusions 53.

In the preferred embodiment connecting protrusions 53 fit snugly on each side of a single upper strip or rib 31 of the edge of the mat while each of the connecting protrusions is arranged over the lower strip 32 running along the an longitudinal edge of the mat. The first connecting protrusion is separated from the first connecting protrusion by approximately 1.5 inch (from center line to center line). Each of the connecting protrusions is approximately 0.22 inch in length and approximately 0.2 inch in width. The space between the center lines of each connecting protrusion in a pair is approximately 0.5 inch.

Extending vertically from connecting protrusion 53 is a hook structure 59. This is arranged to fit snugly on the opposite face of a lower strip 32 which lies adjacent to ramp 50. The hook extends far enough to encompass most of the thickness of one of the lower ribs or strips to form a snug fit. Thus, the ramp can firmly but detachably connect to the lateral edge of a mat.

Preferably, ramp 50 is additionally connected to the longitudinal edges of the mat by bonding the connecting protrusions 53 with adhesive. When being applied to lengths of matting, the longitudinal ramp can be cut to length using either a flat or miter cut.

FIG. 4(*a*) depicts a latitudinal ramp 60 having a connection prong 63 to connect to an adjacent section of the mat. Otherwise, this ramp is virtually identical to the longitudinal ramp 50. As depicted in FIG. 4(*c*), connection prong or protrusion 63 extends beneath the adjacent upper strip 31 and lies in a notch of abutting ends of lower strips 32. Space for the protrusion is provided at the ends of the abutting lower strips by way of a notches 67 cut into the lower half of the thickness of the lower strips. Preferably, the notches are formed as part of the overall mat section molding process. Since the notch is formed in all of the mat peripheries, it is necessary that it be relatively thin (approximately ½ the thickness of the lower strip) in order to avoid undermining the structural integrity of the mat. As with the longitudinal ramp, the preferred method securing the latitudinal ramp to the edges of the mat is by bonding the connecting protrusion to the mat with adhesive.

FIG. 4(*d*) depicts the arrangement of notch 66 when formed with either a lateral or longitudinal connector 34, 35. The notch is formed behind the connector so no part of the material constituting the connector is removed in the formation of the notch. If a ramp is to be applied to that particular surface, the connector is cut away from the rest of the mat section exposing the notch for easy fitting by the protrusion 63 of the ramp. In this manner, the connector is not compromised by the formation of notch 66.

A space, 55,65 is formed on each of the longitudinal and latitudinal peripheral mats 50, 60, respectively. The space 55, 65 is preferably formed in the shape of a semicircle, and permits either of the ramp structures to flex when weight is applied directly to the ramp. This allows the ramp to more firmly grip the floor supporting it, and greatly decreases the tendency of the bottom edge of the ramp to curl up. At the edge of both types of ramp section 50,60, where two ramp sections abut each other, the spaces 55, 65 can be filled with short pieces of solid semicircular material 75 to serve as connectors between the two adjoining ramp sections. These stabilize the connection between ramp sections, providing both support and limiting curling of the lower or outer ramp edges. The connectors can be pressure fit into the cavities or can be bonded to the cavities with adhesive or solvent. When a miter joint is used between a longitudinal ramp 50 and a latitudinal ramp 60, as depicted in FIG. 5 a specially configured connector 76 can be inserted into the cavities 55,65 where they adjoin each other. Such connectors can be formed in the shape of the miter joint created by the inner section of the ramp sections 50,60. In the alternative, the connecting piece can be flexible so as to molded into the shape of the miter connection between the two spaces 55, 65.

When a miter cut of ramp 50 is made, it must match a similar cut made on a latitudinal ramp 60, as that depicted in FIG. 5. The latitudinal ramp 60 is arranged very much like the longitudinal ramp 50. The respective spaces 55 and 60 of the longitudinal and latitudinal ramps are arranged so that they will align with each other as depicted in FIG. 5. The joint 70 between the two types of ramp can be better secured by the placement of a solid connecting plug 76 in both spaces 55, 65 so as to overlap the junction between the two types of ramps. The crucial factor to this arrangement is that both spaces 55, 65 be of the same size and shape so that a support piece such as connecting plug 76 can be placed between the two.

The aforementioned embodiments of the present invention are preferably combined into an overall floor mat system. Since such systems require a great deal of flexibility, all the variations previously mentioned can be employed to the discretion of the mat installer, and as indicated by the particular environment. The previously described latitudinal and longitudinal connectors 34,35, because of the versatility of the aforementioned system, can be arranged in any fashion deemed suitable by the installer. Such arrangements can include mat sections with connectors on all four edges, as well as mat sections without any connectors at all. These mat sections are connected entirely by the connectors of adjacent mat sections. The individual 2 foot by 2 foot sections can be permanently bonded to each other through the use of adhesive as well as the aforementioned longitudinal and latitudinal connectors. The overall mat is preferably divided in 12 foot sections along its longitudinal direction of travel. Such lengths are easily rolled up for easy removal and deployment. The mats can be handled in this manner because they are preferably 0.25 inch in thickness. The matting is arranged to stop enlargement of perforations 33 and subsequent penetration by high heeled shoes by virtue of maintaining a particular volume of 0.02–0.03 cubic inches for the perforations.

There are additional problems that occur even with the matting of the aforementioned embodiments of the present invention. In particular, variations in size over long lengths of floor matting can cause problems in the alignment and fitting of the mat. There are also serious problems caused by warping or dimpling along the length of the mat. These problems can be minimized through the use of a modification of the aforementioned longitudinal ramp. This modification is depicted in FIG. 6.

Figure 6:
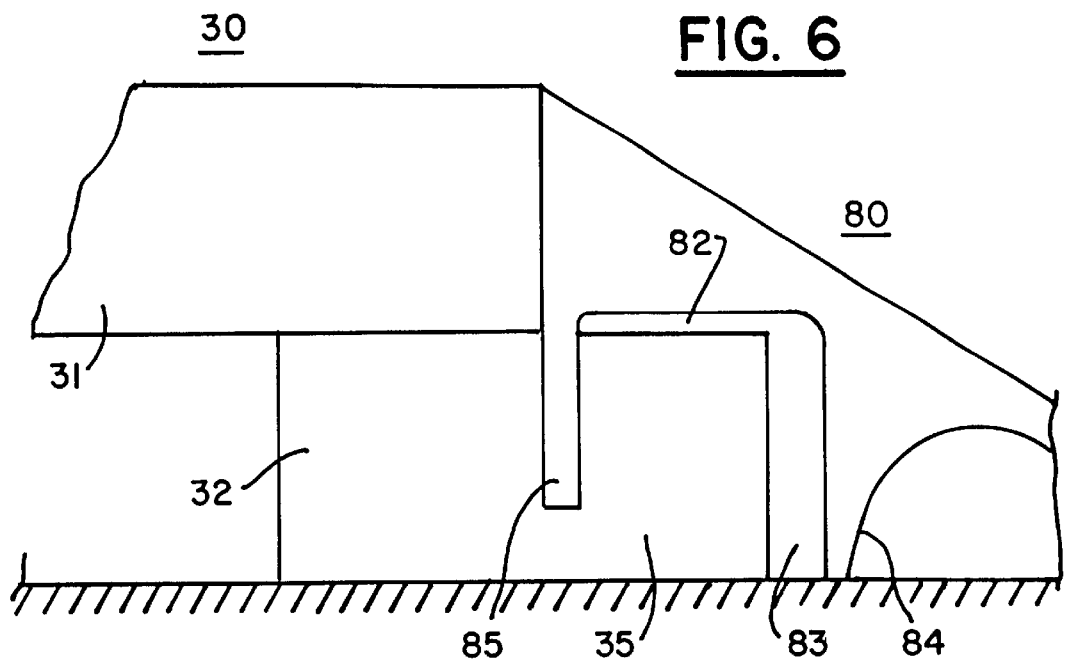
FIG. 6 is a side view depicting the interface between a mat section and the longitudinal ramp constituting an additional embodiment of the present invention.
Figure 7:
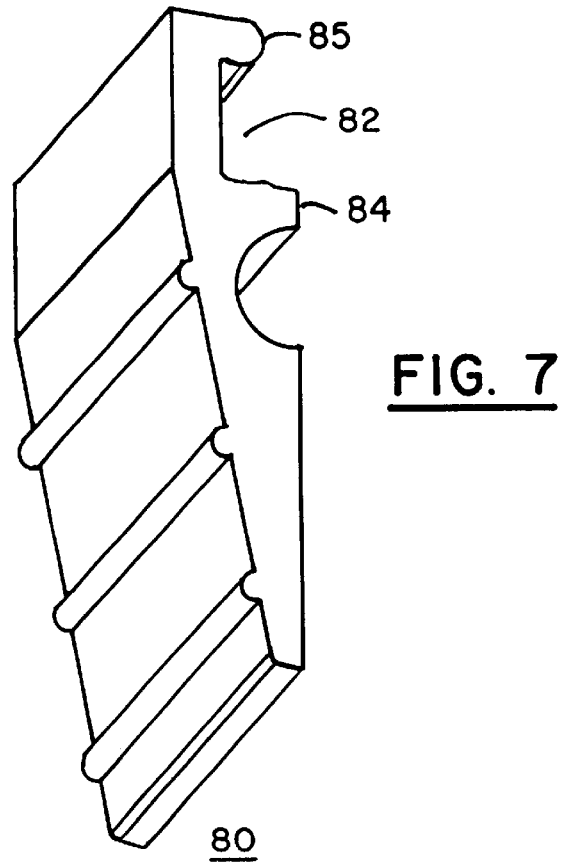
FIG. 7 is a perspective view of the longitudinal ramp depicted in FIG. 6.

As depicted in FIG. 6 longitudinal ramp 80 is attached along the side of mat section 30. This mat section contains upper ribs 31, which are arranged perpendicular to the flow of traffic over the mat section, and lower ribs 32 which are arranged parallel to the direction of travel over the mat section. A connecting extension 35 extends latitudinally from the edge of the mat and fits underneath the longitudinal ramp in cavity 82. Connecting protrusion 85 of ramp 80 serves as a connecting protrusion fitting between lower rib 32 and connecting extension 35. As a result ramp 80 is mechanically held to mat section 30. It should be noted that connecting extension 35 does not fill the entirety of cavity 82 but leaves a small air space 83. The presence of this air space allows leg 84 to flex thereby obtaining a firmer grip on the floor. As a result, there is less shifting and warping of the mat section 30, even over long mat lengths. Preferably, glue is applied to connecting extension 352 to hold it firmly to ramp 80, within cavity 82. While the glue is not entirely necessary, it can be used merely to form a more secure unit that has less tendency to shift. Without the glue, the integrity of air space 83 can be compromised by the shifting of the longitudinal ramp 80 on connecting extension 35. Consequently, the use of glue is preferable for this embodiment.

In this particular embodiment the longitudinal ramp 80 is still connected to a latitudinal ramp along a mitered seam, as shown in FIG. 5. However, with the embodiment of FIG. 6, the latitudinal ramp 80 extends somewhat forward of the latitudinal edge of section 30. As a result, the latitudinal ramp that interfaces with longitudinal ramp 80 will be smaller than that in FIG. 5. Further, the miter seam between the two ramps will no longer be at a 45° angle. Rather, the seam will be adjusted for the longer length of longitudinal ramp 80, along with the reduced width of latitudinal ramp interfacing thereto. No other changes in the latitudinal ramps as shown in previous embodiments of this invention is necessitated by the use of the FIG. 6 embodiment.

Another problem exists with the thin mats of the aforementioned preferred embodiments of the present invention, especially with small, light mat sections. Even with all of the aforementioned improvements, the mat sections tend to slide, especially on slick, vinyl floors, such as those found in retail outlets. This problem is addressed by another preferred embodiment, the use of relatively soft under ribs (longitudinal ribs 32).

Such a product can be manufactured using a modified injection molding process. The process takes place in two steps. First, the plastic material of the upper ribs is injected into the mold, filling only the lower part of the mold. Then, similar material is injected into the upper part of the mold while the material in the lower part is still molten. The material going into the upper portion of the mold is virtually the same as that in the lower portion. However, the material in the upper portion has been provided with an additive that causes that material to remain relatively softer than the material originally placed in the mold. The result is a floor mat of a duel durometer material.

The resulting product has upper ribs that are relatively hard while the lower ribs are relatively soft, even though the overall mat is made out of one material. The use of dual durometer materials to constitute mat 30 can be applied to any of the aforementioned preferred embodiments of the present invention to obtain mats less prone to slip of slick surfaces.

Although a number of preferred embodiments have been disclosed by way of example, the present invention should not be construed or limited thereby. Rather, the present invention should be interpreted to include any variations, modifications, additions or other examples falling within the scope of the following claims.

We claim:

1. A mat system arranged on a support surface to provide a safe, dry travel surface, said mat system comprising:
   (a) a plurality of substantially parallel upper strips, said upper strips being perpendicular to a longitudinal direction of traffic along said mat system, and having upper and lower surfaces;
   (b) a plurality of substantially parallel lower strips, said lower strips being arranged perpendicular to said upper strips and said lower strips having upper and lower surfaces arranged so that said upper surface of said lower strip are permanently affixed to said lower surface of said upper strips; and,
   (c) at least one connecting extension arranged along at least one of said lower strips;

(d) a longitudinal ramp extending parallel to a direction of travel along said mat system and comprising a plurality of lower surfaces arranged on said support surface and a continuous upper surface extending from said upper surface of said upper strips to said support structure, said longitudinal ramp further comprising an integrally formed connecting protrusion arranged to fit between a lower strip and said connecting extension, said connecting protrusion partially defining a first concavity arranged to partially enclose said connecting extension.

2. The mat system of claim 1, wherein said longitudinal ramp further comprises a flexible foot partially defining said first concavity and part of a second adjacent concavity beneath said upper surface of said longitudinal ramp, said flexible foot comprising one of said lower surfaces arranged on said support surface, and operating to flex thereby providing an anti-slip structure.

3. The mat system of claim 2, wherein said first concavity comprises additional space beyond that necessary to contain said connecting extension, wherein said first concavity and said second concavity flex to provide a anti-slip structure.

4. The mat system of claim 3, wherein said upper surface of said ramp comprises a plurality of ridges running along a length of said longitudinal ramp.

5. The mat system of claim 1, wherein said connecting protrusion is frictionally held between a lower strip and said connecting extension.

6. The mat system of claim 5, wherein said connecting protrusion by glue.

7. The mat system of claim 1, wherein said plurality of lower surfaces of said longitudinal ramp are made of softer material than said upper surface of said longitudinal ramp.

8. A mat system arranged on a support surface to provide a safe, dry travel surface, said mat system comprising:
   a) a plurality of substantially parallel upper strips, said upper strips being perpendicular to a longitudinal direction of traffic along said mat system, and having upper and lower surfaces, said upper strips comprising a first material having a first value of hardness;
   b) a plurality of substantially lower strips, said lower strips being arranged perpendicular to said upper strips, and said lower strips having upper and lower surfaces arranged so that said upper surface of said lower strips are permanently fixed to said lower surface of said upper strips, said lower strips comprising a second material having a second hardness value, which is less than said first hardness value, thereby comprising a first anti-slip structure; and
   c) a longitudinal ramp extending parallel to a direction of travel along said mat system and comprising an upper surface extending from said upper surface of said upper strips to said support surface, and a plurality of flexible lower surfaces constituting a second anti-slip structure, wherein said first and second anti-slip structures are softer than said upper surface of said longitudinal ramp.

9. A mat system arranged on a support surface to provide a safe, dry travel surface, said mat system comprising:
   a) a plurality of substantially parallel upper strips, said upper strips being perpendicular to a longitudinal direction of traffic along said mat system, and having upper and lower surfaces, said upper strips comprising a first material having a first value of hardness;
   b) a plurality of substantially lower strips, said lower strips being arranged perpendicular to said upper strips, and said lower strips having upper and lower surfaces arranged so that said upper surface of said lower strips are permanently fixed to said lower surface of said upper strips, said lower strips comprising a second material having a second hardness value, which is less than said first hardness value, thereby comprising a first anti-slip structure;
   c) a longitudinal ramp extending parallel to a direction of travel along said mat system and comprising an upper surface extending from said upper surface of said upper strips to said support surface, and a plurality of flexible lower surfaces constituting a second anti-slip structure; and
   d) a latitudinal ramp having an upper surface and a third anti-slip structure comprised by lower surfaces; wherein said third anti-slip structure is softer than said upper surface of said latitudinal ramp.

10. The mat system of claim 8, wherein said anti-slip structure comprises a plurality of concavities including said lower surface of said longitudinal ramp.

* * * * *